United States Patent [19]

McMahon

[11] Patent Number: 4,461,543
[45] Date of Patent: Jul. 24, 1984

[54] ELECTRO OPTIC SWITCH

[75] Inventor: Donald H. McMahon, Carlisle, Mass.

[73] Assignee: Sperry Corporation, New York, N.Y.

[21] Appl. No.: 362,563

[22] Filed: Mar. 26, 1982

[51] Int. Cl.³ .................................................. G02F 1/29
[52] U.S. Cl. .................................... 350/383; 350/382; 350/403
[58] Field of Search .............................. 350/382-383, 350/388, 403; 455/616

[56] References Cited

U.S. PATENT DOCUMENTS

| 2,745,316 | 5/1956 | Sziklai | 455/616 |
| 2,780,958 | 2/1957 | Wiley | 350/388 |
| 3,667,828 | 6/1972 | Kojima et al. | 350/382 |
| 3,684,350 | 8/1972 | Wentz | 350/388 |
| 3,719,414 | 3/1973 | Wentz | 350/403 |
| 4,359,268 | 11/1982 | Kondo | 350/383 |

OTHER PUBLICATIONS

Steinberg et al., "Design of Integrated Optical Switches for Use in Fiber Data Transmission Systems", IEEE Jr. of Quantum Electronics, 4–1977, pp. 122–128.

Masuda et al., "2×2 Optical Switch & Its Uses", Conf. Cleo 1981 Conf. on Lasers & Electro-Optics (papers in summary form only), pp. 178–179.

Primary Examiner—William H. Punter
Attorney, Agent, or Firm—Howard P. Terry; Seymour Levine

[57] ABSTRACT

An optical switch utilizes a birefringent device to cause orthogonally polarized components of an arbitrarily polarized incident light beam to propagate along separate paths. A polarization rotator is positioned in one path to rotate the polarization of the light beam propagating therealong to that of the light beam in the other path. The two paths are simultaneously deflected to selected parallel paths in accordance with the switching desired. A second polarization rotator reestablishes the initial polarization and the beams are recombined by a second birefringent device to emerge from the selected output terminal as an arbitrarily polarized light.

6 Claims, 20 Drawing Figures

ELECTRO OPTIC SWITCH

BACKGROUND OF THE INVENTION

1. Field of the Invention

The invention pertains to electrically controlled devices for switching optical signals and more particularly to electrically controlled devices for coupling arbitrarily polarized optical signals between predetermined pairs of terminals.

2. Description of the Prior Art

High information transmission capacity, immunity to electro-magnetic interference, and freedom from grounding problems ideally suit optical transmission systems for linking distributed computers and computer controlled industrial system components. Since these optical transmission systems often utilize optical fibers to serially link a multiplicity of electrically driven optical repeater stations, a power failure at one of the stations interrupts the data chain and causes the entire system to fail. To prevent such a catastrophe, a fail safe optical switch is employed at each repeater and component station to optically bypass the station that loses local power. These fail safe switches must possess low insertion loss properties, provide high isolation between the input and the output fibers during the "Power On" mode, and must function effectively with unpolarized light coupled thereto from a multimode fiber. Electro-optic switches, as for example, 2×2 cross bar switches, of the prior art possess sufficiently low insertion loss, but do not provide the desired optical isolation between the input and output terminals during the energized switch mode. Tandem arrangements of these switches, as described in U.S. Pat. No. 4,011,543, issued to Soref, et al. on Mar. 8, 1977 and assigned to the assignee of the present invention, may provide the desired performance but appreciably increase the number of components employed and concomitantly the cost of the switches.

SUMMARY OF THE INVENTION

An optical switch constructed according to the principles of the present invention includes an input birefringent device wherein the ordinary and extraordinary polarizations of unpolarized light relative and incident thereto are deflected therein to emerge therefrom along parallel paths. An input half wave plate is positioned in one path of the emerging waves, as for example the path of the ordinary wave to rotate the polarization through 90°, thereby establishing substantially equal polarizations for the waves traversing the two paths. The two waves are then incident to a switch position selector wherein the waves are guided along parallel paths electrically selected in accordance with the input-output terminal coupling desired, and emerge therefrom along two substantially parallel paths with substantially the same polarizations as that of the waves incident thereto. An output half wave plate is located in one emerging path to rotate the polarization of the wave propagation therealong through 90°, thereby reestablishing the ordinary-extraordinary polarization of the waves traversing the two parallel paths. The two orthogonally polarized waves are then incident to an output birefringent device, having an optic axis substantially parallel to the optic axis of the input birefringent device, and emerge therefrom along a common path directed to the selected output terminal.

In one embodiment of the invention, a bypass switch, the path selector includes a birefringent device, with an optic axis that lies in a plane substantially perpendicular to the optic axis of the input and output birefringent devices. A nematic twist liquid crystal is positioned between the path selector birefringent device and the input half wave plate. This combination of birefringent device and liquid crystal provides the wave guidance to achieve the desired input-output terminal couplings.

In a second embodiment of the invention, a 1XN switch, a plurality of nematic liquid crystal-birefringent device combinations are arranged in tandem. The state of the liquid crystal preceding each birefringent device determines whether ordinary or extraordinary polarized waves are incident to the associated birefringent device. This polarization selection in turn determines whether the waves are deflected in or propagate undeflected through the birefringent device. Thus, each liquid crystal-birefringent device combination provides a 1×2 incremental switch, which in tandem create the desired 1XN switch where $\log_2 N$ is the number of 1×2 switches contained in the 1XN switch.

In a third embodiment of the invention, a 2×2 switch, the path selector comprises two nematic liquid crystal-birefringent device combinations operating in tandem. In this configuration the optic axes of the birefringent devices are substantially aligned mutually parallel and the liquid crystals in each combination are located to be effective in only one of two possible pairs of parallel paths. The liquid crystal in one combination being effective in the first pair of paths while the liquid crystal in the other combination being effective in the second pair of paths.

Other features of the invention will become apparent from the following description and from the accompanying drawings which illustrate, as non limitive examples, preferred embodiments thereof.

BRIEF DESCRIPTION OF THE DRAWINGS

FIGS. 6b and 6c are schematic diagrams of a view orthogonal to the view of FIG. 6a with ray paths indicated thereon.

FIGS. 7b and 8b together show a schematic diagram of a view orthogonal to the view of FIGS. 7a and 8a for

DESCRIPTION OF THE PREFERRED EMBODIMENTS

Referring to FIG. 1 there is illustrated three switch types constructible with the utilization of the principles of the present invention. In FIG. 1a switch terminal coupling for a "POWER-ON" repeater station is shown. Optical signals incident to the switch 10 are coupled from a first input terminal 11 to the input terminals of a repeater 12 via a first output terminal 13. Signals of the output terminal of the repeater 12 are then coupled by a second input terminal 14 of the switch 10 to a second output terminal 15 and therefrom to the interstation optical transmission line. In FIG. 1b is shown terminal couplings of the bypass switch for the repeater station "POWER-OFF" condition. Optical signals incident to the station are coupled to the first input terminal 11 of the switch 10 and directly coupled via the output terminal 15 to the interstation optical transmission lines, while optical signals, incident to the input terminal 14 if any, are deflected such that optical signals from input terminal 14 are substantially not coupled to the output terminals 13 and 15.

Figure 1A:
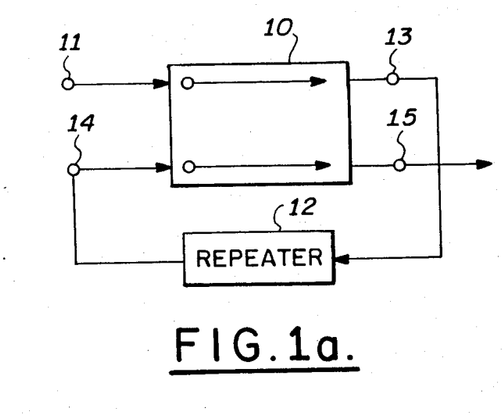
FIGS. 1a and 1b are illustrations depicting bypass switch operation.
Figure 1B:
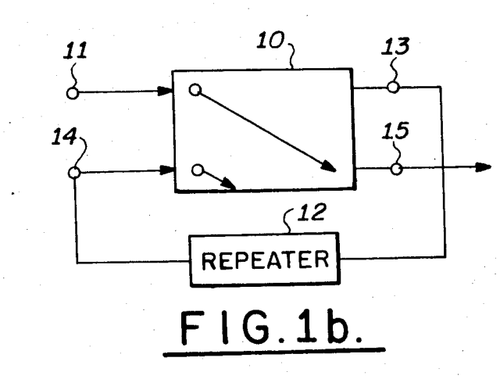
Figure 1C:
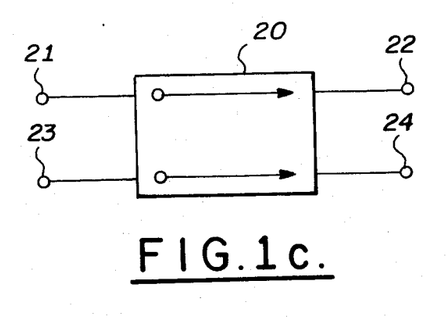
FIGS. 1c and 1d are illustrations depicting 2×2 switch operation.
Figure 1D:
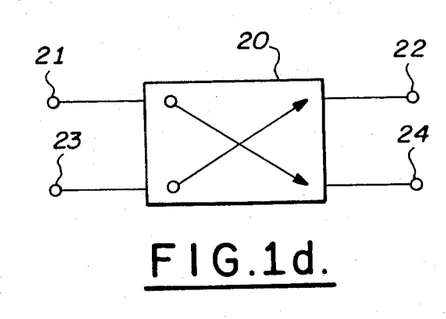

FIGS. 1c and 1d are illustrative of two states of a 2×2 switch. In one state of optical switch 20 optical signals incident to a first input port 21 are coupled to a first output port 22 and optical signals coupled to a second input port 23 are coupled to a second output port 24. Port coupling for the switch 20 in its second state is from the first input port 21 to the second output port 24 and from the second input port 23 to the first output port 22.

Figure 1E:
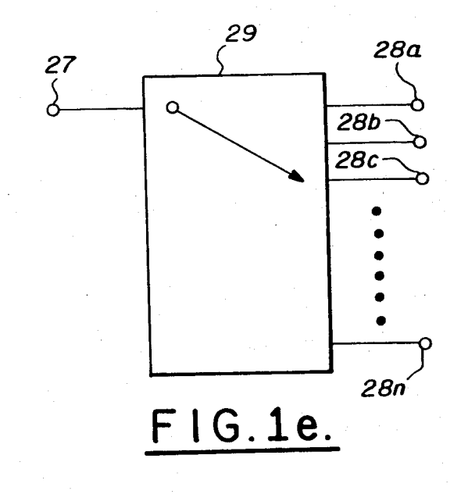
FIG. 1e is an illustration depicting 1XN switch operation.

FIG. 1e illustrates the input port 27 and output ports 28a through 28n of a 1XN switch 29. This switch has N switch positions, each of which couples one of the output ports 28a through 28n to the input port 27, with coupling between input port 27 to output port 28c indicated on the drawing.

Figure 2A:
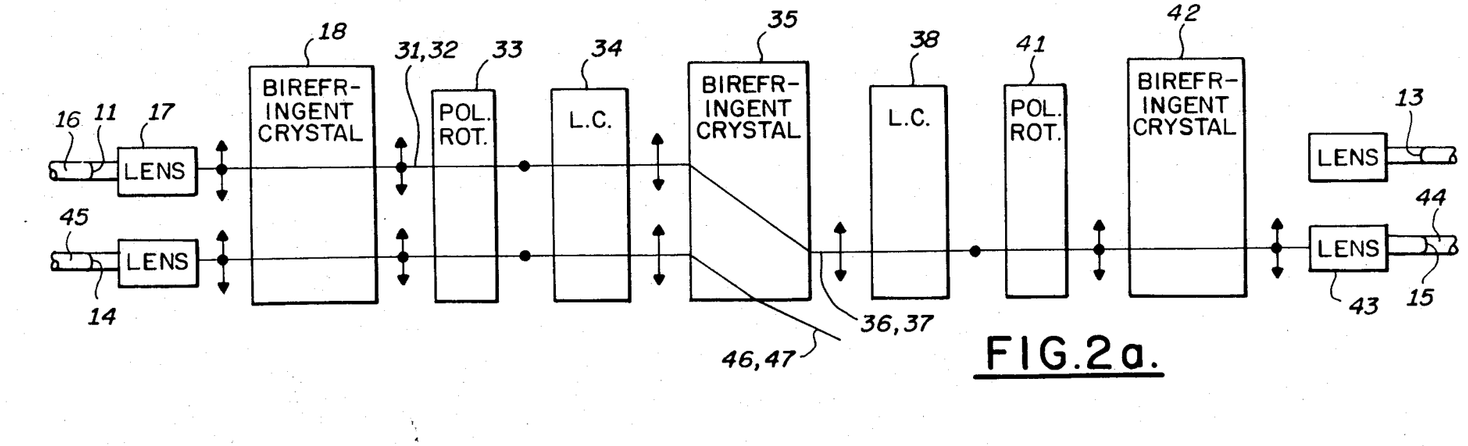
FIGS. 2a and 2b are schematic diagrams of orthogonal views of a bypass switch with ray paths thereon for a first state thereof.
Figure 2B:
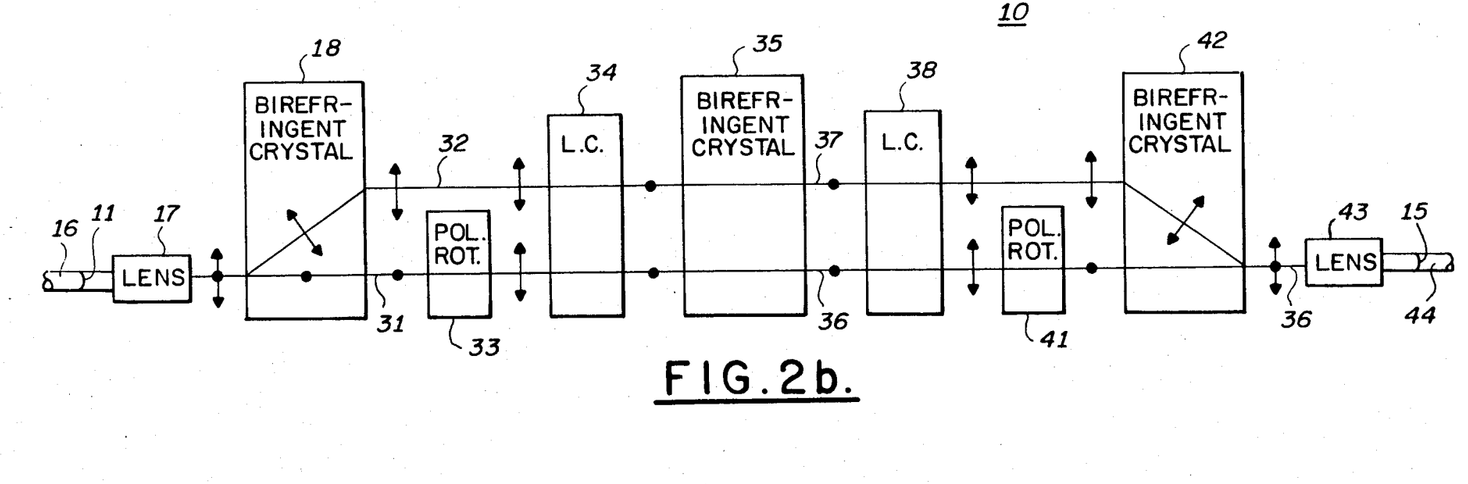

FIGS. 2a and 2b are schematic diagrams of the bypass switch with ray paths indicated thereon for coupling optical signals between the input terminal 11 and the output terminal 15. FIG. 2a is representative of the optical paths traversed in the plane containing the axis of the terminals 11, 13, 14, and 15, while FIG. 2b is representative of the paths in the planes perpendicular to the terminal axial plane and passing through the axis of terminals 11, 15, and the transitional plane therebetween. In FIGS. 2a and 2b all figures subsequent thereto short lines with arrows on each end represent polarizations in the plane of the figure while dots represent polarization perpendicular to the plane of the figure. Referring to FIG. 2b, an arbitrarily polarized optical signal incident to the input terminal 11 from an optical fiber 16 may be collimated by a lens 17 to be incident to a uniaxial birefringent crystal, as for example calcite. When a beam of aribitarily polarized light is incident to the birefringent crystal, there will be two spatially separated refracted beams emerging therefrom: one, the ordinary polarized beam, which is refracted in accordance with Snell's Law, and one, the extraordinary polarized beam, which is not refracted in accordance with Snell's Law. When the two opposite faces of the birefringent crystal are parallel, the two refracted beams emerge parallel to the incident beam and therefore parallel to each other. When the incident light is normal to the surface, the extraordinary beam will be refracted at some angle that is not zero and will emerge therefrom parallel to, but displaced from, the incident beam; the ordinary beam will emerge without transverse deviation.

Displacement of the extraordinary ray by a birefringent crystal lies in a plane parallel to the surface that includes the optic axis. Maximum transverse displacement of the extraordinary ray occurs when the optic axis is oriented approximately 45° with respect to the input and output surfaces of the birefringent crystal. At this maximum displacement, the direction of the extraordinary ray is substantially 6° from the propagation direction of the ordinary ray.

Components, of the arbitrary polarized beam, normally incident to the birefringent crystal 18 having ordinary polarization with respect thereto emerge therefrom as an undeflected beam along path 31 that is colinear with the incident path, while components having extraordinary polarization are deflected to emerge along a displaced parallel path 32.

In FIG. 2b the optic axis of the calcite crystal 18 is in the plane of the figure and tilted upward to the right at an angle of substantially 45°, while the optic axis of the calcite crystal 42 is in the plane of the figure and tilted upward to the left at an angle of substantially 45°. Thus, the ordinary polarization of the calcite crystal 18 is oriented perpendicular to the plane of the figure and the extraordinary polarization is oriented parallel to the plane of the figure. A polarization rotator 33, as for example a halfwave plate (HWP) is positioned in the path 31 to transform the ordinary polarized beam incident thereto from the crystal 18 to an orthoganal polarized beam emerging therefrom.

After the polarization rotation by the HWP, two equivalently polarized beams are incident to a bistate element such as a nematic liquid crystal 34, assumed in FIG. 2a and 2b to be in the unexcited state. Liquid crystals, of the type under consideration, in the unexcited state operate in a twist mode. The molecular surface alignment on one side of the cell is oriented 90° to the molecular surface alignment on the other side with a gradual twisting of the molecular orientation between the two surfaces. This twisting action of the liquid crystal molecules forces the polarization of an optical signal incident thereto to follow the twist and emerge therefrom at a polarization perpendicular to the polarization of the incident signal. Thus, the optical signal emerging from the liquid crystal 34 on paths 31 and 32 have extraordinary polarization relative to the birefringent crystal 35, which may also be calcite. Birefringent crystal 35 is positioned with its optic axis in plane of FIG. 2a while positioned with its optic axis in the plane of FIG. 2b. Thus the optic axis of birefringent crystal 35 is oriented downward to the right at an angle of substantially 45° in the plane of FIG. 2a. With this orientation a beam with ordinary polarization relative to the birefringent crystal 18 has an extraordinary polarization relative to the birefringent crystal 35. As shown in FIG. 2a, the beams along paths 31 and 32 having extraordinary polarization relative to birefringent crystal 35 are refracted therein and emerge therefrom along deflected paths 36 and 37 in the terminal axial plane. The beams traversing paths 36 and 37 are then incident to a second unexcited liquid crystal 38 and emerge therefrom with extraordinary polarization relative to the birefringent crystals 18 and 42. The beam along path 36 then passes through a second polarization rotator 41, which may also be a halfwave plate, and emerge therefrom as an ordinary wave. The extraordinary wave along path 37 and the ordinary wave now on path 36 are incident to a third birefringent crystal 42 having its optic axis in a plane substantially parallel to the optic axis of the birefringent crystal 18, whereby the beam along path 37 is refracted downward to merge with the ordinary beam along path 36. A second lens 43 is positioned in path 36 to focus collimated beams propagating therealong to the output terminal 15 for coupling to an output optical fiber 44.

When the liquid crystals 34 and 38 are in the unexcited state as above, an arbitrarily polarized optical signal incident to terminal 14 via an optical fiber 45 will be processed as described above and be deflected along paths 46 and 47 such that the beams are not directed towards the output ports 13 and 15.

Figure 3A:
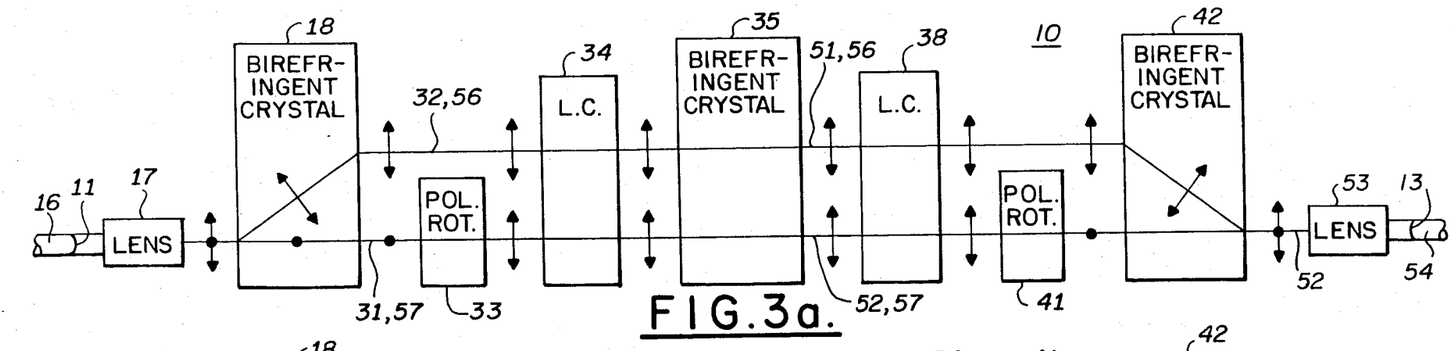
FIGS. 3a and 3b are schematic diagrams of orthogonal views of a bypass switch with ray paths thereon for a second state thereof.
Figure 3B:
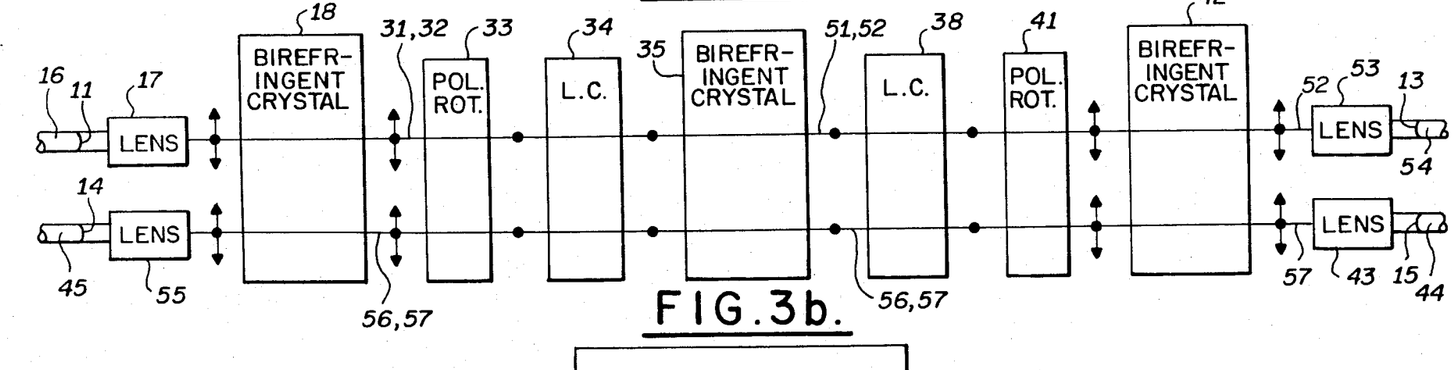

Referring now to FIGS. 3a and 3b, when voltages are applied to the liquid crystals 34 and 38, the twisting orientation of the molecular alignment is removed and the optical signals propagating therethrough do not experience a polarization change. Under these conditions, the optical beams incident to the birefringent crystal 35 along paths 31 and 32 remain extraordinary polarized with respect to the birefringent crystal 18, but ordinary polarized with respect to the birefringent crystal 35 and propagates therethrough undeflected to emerge therefrom along paths 51, 52. These beams propagate through liquid crystal 38 without a polarization rotation. The combination of liquid crystals 34 and 38 with birefringent crystal 35 perform as an optical path selector, causing the split light beam to follow a selected one of two possible path pairs. The beam along path 51 is incident directly to the birefringent crystal 42 while the beam along path 52 is incident to the birefringent crystal 42 via a polarization rotator 41 to establish a beam with ordinary polarization relative to the birefringent crystal 42 along path 52. The incident extraordinary and ordinary polarized beams are merged by the birefringent crystal 42, focused by lens 53, and coupled to an output optical fiber 54 via the output port 13. In a similar manner light incident to input port 14 via optical fiber 45 is collimated by lens 55 and split by birefringent crystal 18 to propagate along paths 56 and 57 as extraordinary and ordinary beams, respectively. The beams propagate through the polarization rotators 33 and 41, the liquid crystals 34 and 38, and the birefringent crystals 35 and 42 and emerge on a common path 57 as a collimated beam that is focused by lens 43 to the output optical fiber 44 via the output port 15, all as previously described with respect to the coupling between ports 11 and 13.

Figure 4:
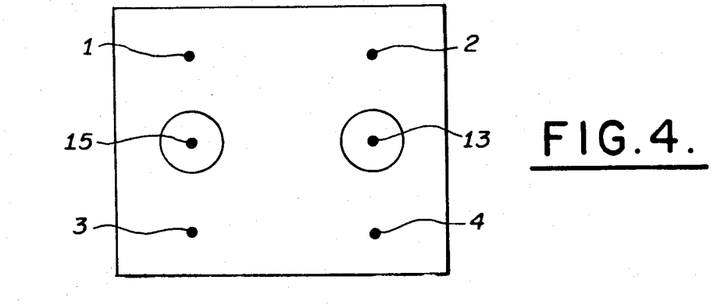
FIG. 4 is an illustration useful for describing the cross talk characteristics of a bypass switch constructed in accordance with the principals of the invention.

In the optical switch described above, the principal source of light leakage, i.e. cross talk between channels, is incomplete polarization conversion through the polarization rotators and the liquid crystals. When this switch is in the state shown in FIG. 2, i.e. the liquid crystals are not excited, substantially all of the light incident to input port 11 emerges from the output port 15. First order leakage light signals appear in the output plane vertically displaced from the output ports in the positions 1, 2, 3 and 4 shown in FIG. 4. The leakage at position 1 is due to incomplete polarization conversion of the beam along paths 37 by the liquid crystal 38; at position 2 due to incomplete polarization conversion of the beam along path 31 by the liquid crystal 34; at position 3 due to incomplete polarization rotation along path 36 by polarization rotator 41 and liquid crystal 38; and at position 4 due to incomplete polarization rotation along path 31 by the polarization rotator 33 and liquid crystal 34. Thus, the leakage light does not enter the output terminals 13 and 15 and may be prevented from reaching the output plane by the proper positioning of optical absorbing material. It should be recognized by those skilled in the art that leakage components for the switch state of FIG. 3 are also displaced in the output plane above or below the output terminals 13 and 15 and that the description with respect to light leakage for the switch state of FIG. 2 is equally applicable to the switch state of FIG. 3.

It should also be recognized by those skilled in the art that the birefringent crystals which transversely displace the two polarizations may be replaced by birefringent prisms whereby transverse displacements are replaced by angular displacements. The basic requirements are that the two polarizations be spatially separated, that one polarization be rotated to be substantially colinear with the other, that the two substantially equally polarized beams be guided along parallel paths through a path selector to provide the switching action, that upon emerging from the path selector the rotated polarization be rotated again to substantially its initial direction, and that the two beams be recombined for coupling to the selected output terminal.

Figure 5A:
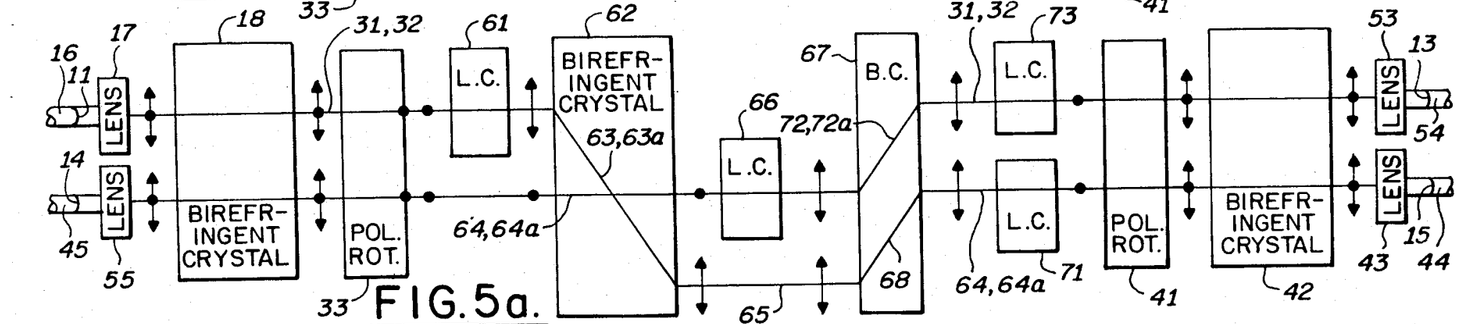
FIG. 5a is a schematic diagram of a view of a 2×2 switch in a first switching state.
Figure 5B:
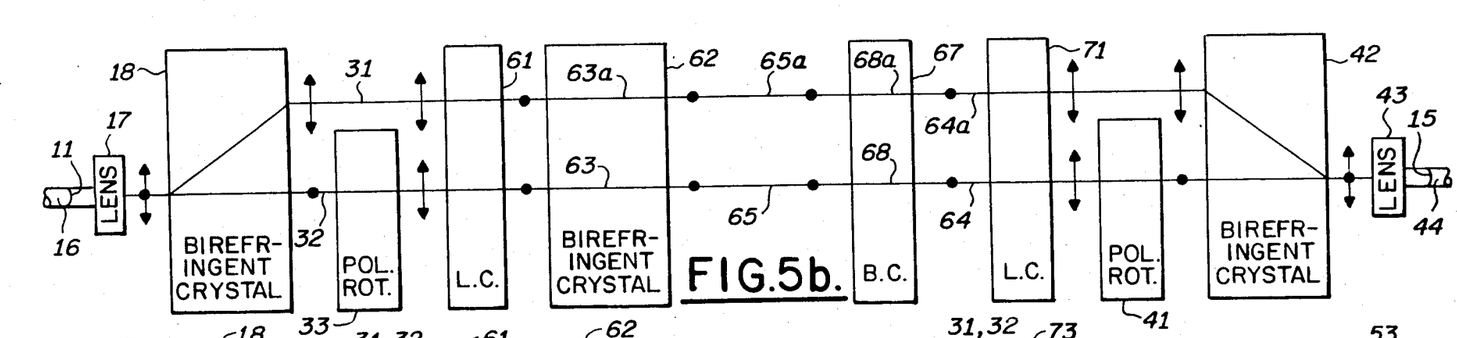
FIGS. 5b and 5c are schematic diagrams of a view orthogonal to the view of FIG. 5a with ray paths in the orthogonal plane indicated thereon.
Figure 5C:
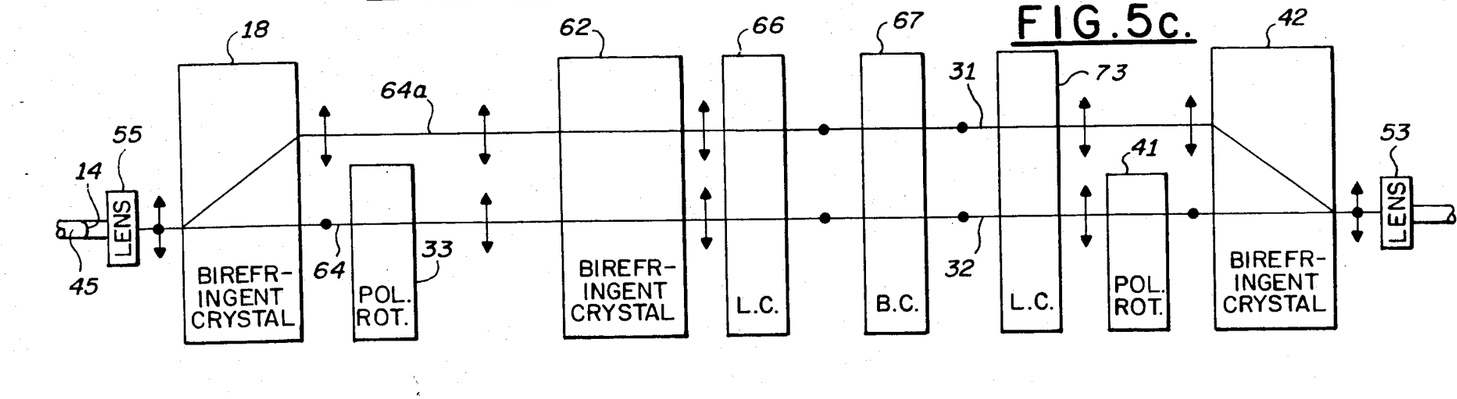
Figure 6A:
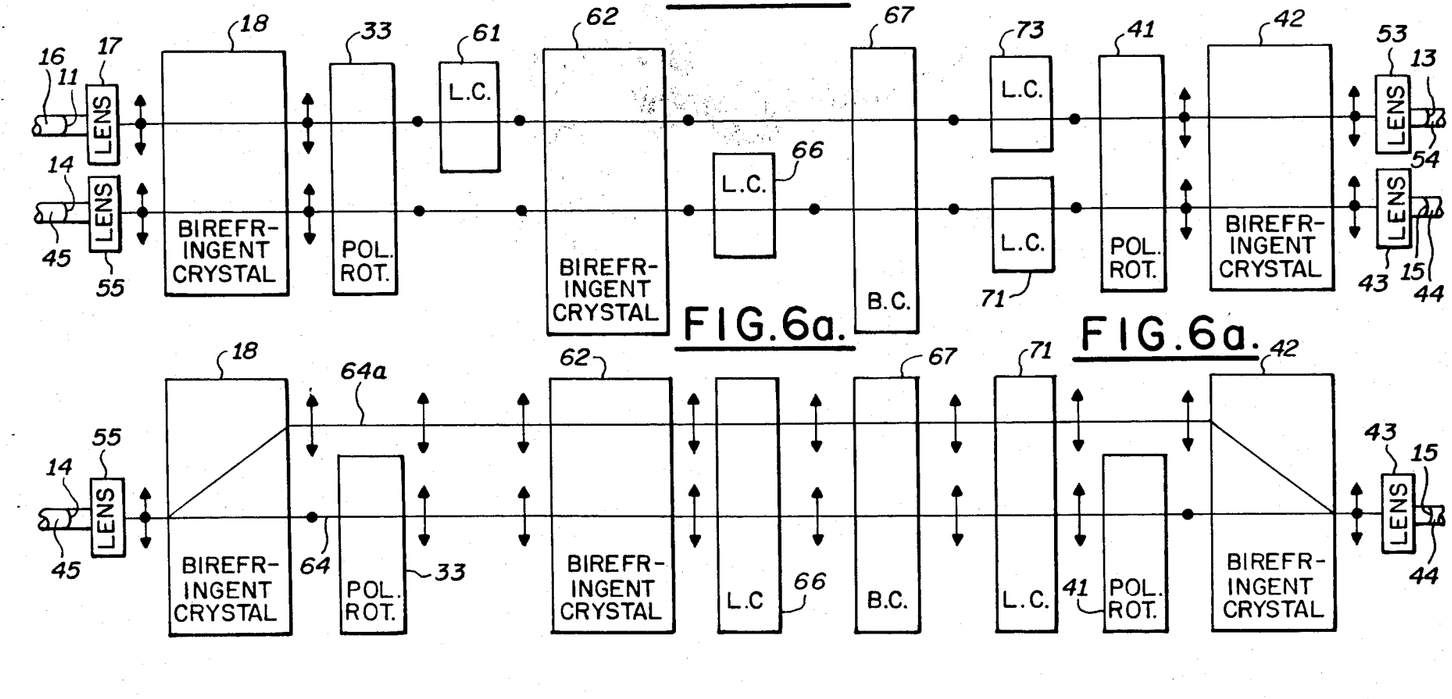
FIG. 6a is a schematic of a view of a 2×2 switch in a second switching state configuration.
Figure 6B:
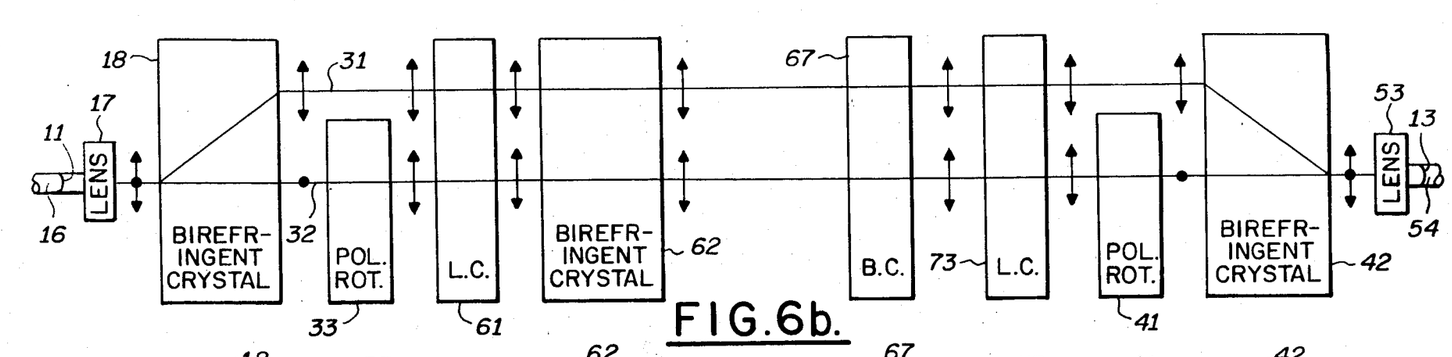

FIGS. 5 and 6 schematically show a 2×2 switch embodiment of the invention, wherein elements in common with previously referenced elements bear the same referenced numerals and wherein elements not along a propagation path under consideration are not shown. In FIG. 5A the propagation paths, in the plane of the terminal axes, for cross coupling input terminal 11 to output terminal 15 and input terminal 14 to output terminal 13 are shown. As previously described, an arbitrarily polarized optical signal from input optical fiber 16 is coupled via input terminal 11 to lens 17, and therefrom as a collimated beam through the birefringent crystal 18 and the polarization rotator 33, wherefrom two collimated beams emerge along paths 31, 32 having extraordinary polarization relative to the birefringent crystal 18. The two extraordinary polarized beams are incident along paths 31, 32 to a nematic liquid crystal 61, in the unexcited state, wherefrom they emerge as ordinary polarized beams.

FIG. 5b traces the ray paths in the planes perpendicular to the terminal axial plane for the rays of the collimated beams formed from the beams emitted from lens 17. The ordinary polarized beams emerging from the liquid crystal 61 are incident to a birefringent crystal 62 that is positioned with its optical axis in a plane substantially perpendicular to the optical axis of the birefringent crystal 18. Thus, the beam incident to the birefringent crystal 62 has an extraordinary polarization relative thereto and is refracted therein. Birefringent crystal 62 is of a dimension to provide refracted paths 63, 63a of lengths sufficient to cross the axial path 64 between the input terminal 14 and the output terminal 15 and emerge from the birefringent crystal 62 along parallel paths, 65, 65a that circumvent a nematic liquid crystal 66 in the axial path 64. The beams along paths 65, 65a are incident to another birefringent crystal 67, positioned with the optic axis in a plane substantially parallel to the optic axis of the birefringent crystal 62, are refracted therein along parallel paths 68, 68a and emerge therefrom along the axial path 64 and a path 64a parallel thereto, respectively.

Upward displacement of the beams in the birefringent crystal 67 results from orienting the optical axis thereof upward, as opposed to the downward orientation of the optic axis of the birefringent crystal 62. By making birefringent crystal 62 twice as thick as birefringent crystal 67 the output optical paths to the lenses 43, 53 for the switched and unswitched states coincide. The beams along path 64, 64a have extraordinary polarization relative to the birefringent crystals 62, 67 and are incident to an unexcited nematic liquid crystal 71, have the polarization twisted therein and emerge therefrom with polarizations that are ordinary with respect to the birefrigent crystals 62, 67, but are extraordinary with respect to birefringent crystals 18, 42. The beam along path 64 passes through polarization rotator 41 and emerges therefrom with ordinary polarization relative to birefringent crystal 42, while the beam along path 64a is directly incident to the birefringent crystal 42 with extraordinary polarization. The two beams merge to the axial paths as previously described and thereafter are coupled as a single collimated beam with arbitrary polarization to lens 43 and focused thereby to optical fiber 44 via the output terminal 15.

In FIG. 5c arbitrarily polarized signals incident from the optical fiber 45 to the input terminal 14 are coupled through the birefringent crystal 18 and the polarization rotator 33 to emerge therefrom along parallel paths 64, 64a as extraordinary polarized beams relative to the birefringent 18, as previously described. Light beams along paths 64 and 64a are then incident to the birefringent crystal 62 with ordinary polarization relative thereto and emerge therefrom to be incident to the unexcited liquid crystal 66. The beams emerge from liquid crystal 66 along paths 65, 65a to be incident to the birefringent crystal 67 as extraordinary polarized waves and are refracted therein along paths 72, 72a to emerge therefrom along the paths 31, 32. The polarizations of the beams along paths 31, 32 are rotated to the orthogonal polarizations by a liquid crystal 73, wherefrom the two beams are processed by the polarization rotator 41, birefringent crystal 42, and lens 53 to be coupled through the port 13 to the output optical fiber 54 as previously described.

FIGS. 6a, 6b, and 6c are schematic diagrams of the 2×2 switch with beam paths traced therethrough with the liquid crystals 61, 66, 71, and 73 in the excited state, for which beams propagate through the crystals without a polarization rotation. When these conditions prevail the ordinary polarized beam derived from the arbitrary polarized collimated beam from lenses 17, 55 propagate along the axial paths 32, 64 respectively to correspondingly couple to the output lens 53 and 43. Concomitantly the extraordinary polarized beam split from the arbitrary polarized beams from lenses 17, 55 follow paths 31, 64a respectively parallel to the axial paths 32, 64 to the birefringent crystal 42. The beams along paths 31, 64a are refracted by birefringent crystal 42 emerge therefrom along the paths 32 and 64 respectively, all as previously described, to provide coupling between the input terminal 11 to the output terminal 13 and from the input terminal 14 to the output terminal 15.

Refer now to FIGS. 7a 8a and 7b, 8 wherein two views of a 1XN switch embodiment of the invention are shown. Though a 4×4 output array is indicated in FIG. 7, it will be recognized by those skilled in the art that this number is not so limited and that additional output ports may be added with an appropriate addition of switch components. A 1XN switch may be realized with the basic switch configuration of FIGS. 5 and 6 by positioning and a liquid crystal 81, a birefringent crystal 82 between polarization rotator 33 and liquid crystal (61 in FIGS. 5 and 6) 83, a liquid crystal 85 and a birefringent crystal 86 between birefringent crystal 84 (62 in FIGS. 5 and 6) and liquid crystal 87 (66 in FIGS. 5 and 6). Birefringent crystal 88 and liquid crystal 89 are elements 67, and 73 respectively in FIG. 5. Birefringent crystals 82, 86 are positioned with the optic axes thereof substantially in parallel alignment, tipped 45° down to the right in FIG. 7a, while birefringent crystals 84, 88 are positioned with the optic axes tipped 45° down to the right in FIG. 7b. In one switch position the liquid crystal 81 is in the excited state, optical signals propagating therethrough without a polarization rotation, while liquid crystals 83, 85, 87, and 89 are in the unexcited state, optic signals propagating therethrough experiencing a polarization twist of 90°. Under these conditions the extraordinary polarized signals incident to the liquid crystal 81 propagate therethrough along paths 31, 32 without rotation and are deflected by the birefringent crystal 82, as for example in the vertical plane, to propagate along paths 92, 92a. After propagating through the liquid crystal 83 the optic signals experience 90° polarization rotation and are incident to the birefringent crystal 84 with extraordinary polarization, whereby signals are deflected in the horizontal plane to be incident to the liquid crystal 85 along paths 93, 93a. Upon emerging from liquid crystal 85 the optical signals have extraordinary polarization relative to the birefringent crystal 86 and are deflected thereby to be incident to the liquid crystal 87 along paths 94, 94a, wherein the polarization is once again twisted to the orthogonal polarization. The signals are now extraordinary polarized with respect to birefringent crystal 88 and are deflected once again in the horizontal plane to paths 95, 95a to be incident to the liquid crystal 89, wherein they are twisted once again and emerge therefrom as extraordinary polarized waves relative to the birefringent crystal 42. The polarization rotator 41 is in four segments in the configuration of FIGS. 7 and 8. The optical signal on path 95 is rotated by the polarization rotator 41c, wherefrom it emerges with ordinary polarization relative to the birefringent crystal 42. The signal now on path 95a is refracted by the birefringent crystal 42 to merge with the signal on path 95 to be incident, as an arbitrarily polarized signal, to the lens 96.

Figure 7A:
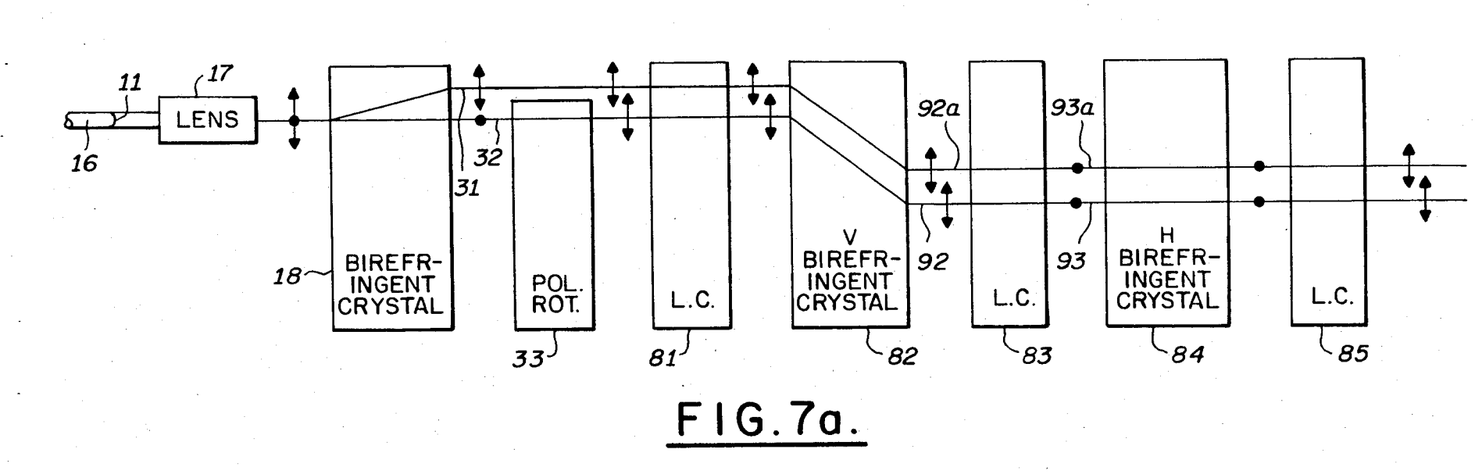
FIGS. 7a and 8a together show a schematic diagram of one view for one position of a 1×16 switch with ray paths indicated thereon.
Figure 7B:
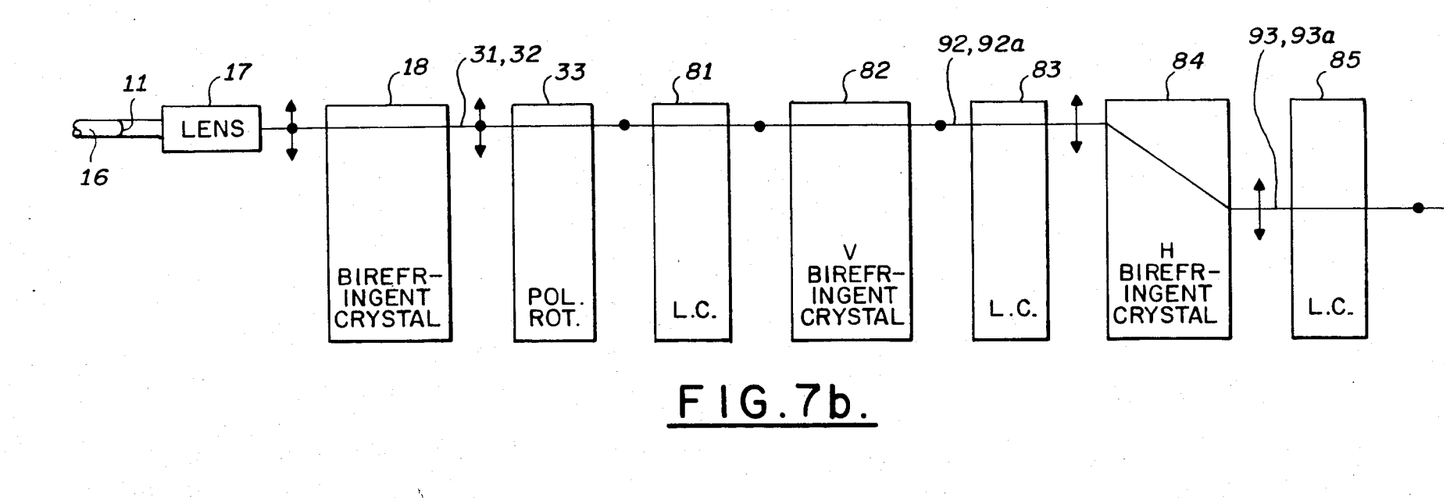
Figure 8A:
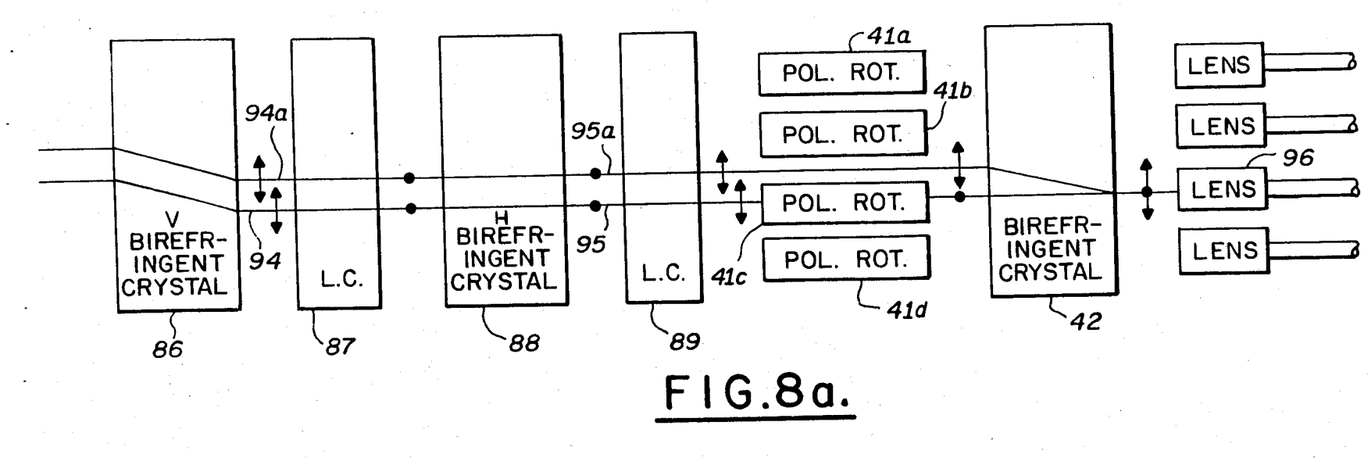
Figure 8B:
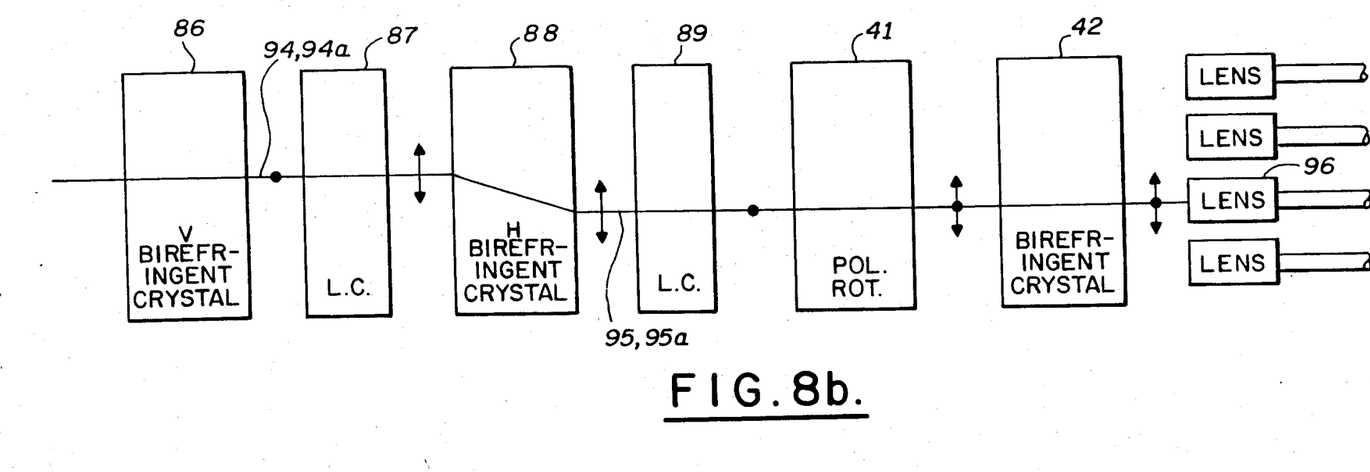

In the embodiment of FIG. 7, the two combinations of liquid crystals and vertical plane defracting birefringent crystals and the two combinations of liquid crystals and horizontal plane defracting birefrigent crystals couple optical signals to a selected terminal of a 4×4 array of output terminals. It should be apparent that the number of output terminals is doubled with each liquid crystal - birefringent crystal combination addition.

While the invention has been described in its preferred embodiments, it is to be understood that the words that have been used are words of description rather than of limitation and that changes within the purview of the appended claims may be made without departing from the true scope and spirit of the invention in its broader aspects.

I claim:

1. An apparatus for switching arbitrarily polarized optical signals comprising:
    first birefringent means positioned to receive said arbitrary polarized optical signals for deflecting components thereof at a first polarization to a first optical path and components thereof at a second polarization to a second optical path, said first and second optical paths defining a first plane;

first polarization rotator means positioned to receive said components propagating along said second path for rotating said second polarization and emitting therefrom components propagating along said second path polarized substantially at said first polarization;

optical path selector means positioned to receive said components propagating along said first path and said components emitted from said first polarization rotator means along said second path for guiding said components therethrough along one pair of optical paths selected from at least two selectable pairs of optical paths and emerge therefrom to propagate along said selected optical path pair:

second polarization rotator means positioned in one path of said selected optical path pair for rotating said first polarization substantially to said second polarization as said components along said one path of said selected path pair propagates therethrough;

second birefringent means positioned to receive light propagating along said selected path pair for deflecting components incident thereto along said selected path pair to a common optical path and emerge thereon as an arbitrarily polarized optical signal.

2. An apparatus for switching arbitrarily polarized optical signals in accordance with claim 1 further including;

first lens means positioned to receive said arbitrarily polarized optical signals for collimating said received signals and providing an arbitrarily polarized collimated beam incident to said first birefringent means; and second lens means positioned to receive said arbitrarily polarized optical signals along said common path for focusing said optical signals along said common paths through an output terminal.

3. An apparatus for switching arbitrarily polarized optical signals in accordance with claims 1 or 2 wherein said path selector means includes;

first and second bistate means each having first and second states and positioned between said first and second polarization rotator means for transforming light incident thereto at one of said first and second polarizations to light emerging therefrom at one of said first and second polarizations other than said one when in said first state, and for permitting light to propagate therethrough without a polarization change when in said second state; and third birefringent means positioned between said first and second bistate means for deflecting light at said second polarization incident thereto along optical paths in said first plane to propagate in a second plane substantially perpendicular to said first plane and emerge therefrom to propagate along deflected optical paths in a plane substantially parallel to said first plane and for permitting light at said first polarization incident thereto to propagate therethrough and emerge therefrom substantially undeflected.

4. An apparatus for switching arbitrarily polarized optical signals in accordance with claim 3 further including:

third bistate means having first and second states and positioned between said third birefringent means and said second bistate means for transforming light incident thereto at one of said first and second polarizations to light emerging therefrom at one of said first and second polarizations other than said one polarization when in said first state, and for permitting light to propagate therethrough without a polarization change when in said second state; and fourth birefringent means positioned between said second and third bistate means for deflecting light at said second polarization, incident thereto along optical paths in said first plane, along paths in a second plane substantially perpendicular to said first plane and emerge therefrom to propagate along deflected optical paths in planes substantially parallel to said first plane and for permitting light at said first polarization incident thereto to propagate therethrough and emerge therefrom substantially undeflected.

5. An apparatus for switching arbitrarily polarized optical signals in accordance with claim 4 further including:

fourth bistate means having first and second states and positioned between said third birefringent means and said third bistate means for transforming light incident thereto at one of said first and second polarizations to light emerging therefrom at one of said first and second polarizations other than said incident one polarization when in said first state, and for permitting light to propagate therethrough without a polarization change when in said second state;

fifth birefringent means positioned between said third and fourth bistate means for deflecting light incident thereto at said first polarization along optical paths in said first plane to emerge therefrom to propagate along optical paths in a plane substantially parallel to said second plane and for permitting light incident thereto at said second polarization to propagate therethrough undeflected;

fifth bistate means having first and second states and positioned between said fourth birefringent means and said second bistate means for transforming light incident thereto at one of said first and second polarization to light emerging therefrom at one of said first and second polarization other than said incident one polarization when in said first state, and for permitting light to propagate therethrough without a polarization change when in said second state, and sixth birefringent means positioned between said second and fifth bistate means for deflecting light incident thereto at said first polarization along optical paths in said first plane and planes substantially parallel thereto, to optical paths in said second plane and planes substantially parallel, thereto and for permitting light incident thereto at said second polarization to propagate therethrough and emerge therefrom undeflected.

6. An apparatus for switching arbitrarily polarized optical signals in accordance with claims 1 or 2 wherein said path selector means comprises at least one combination of beam deflecting elements, said combination including:

bistate means having first and second states for transforming light incident thereto at one of said first and second polarizations to light emerging therefrom at one of said first and second polarizations other than said one polarization of said incident light when in said first state, and for permitting light to propagate therethrough without a polarization change when in said second state; and birefringent means positioned between said first and second bistate means for deflecting light at one of said first and second polarization incident thereto along optical paths in one of said first and second planes to propagate in a plane substantially perpendicular to said incident one of said first and second planes and emerge therefrom to propagate along deflected optical paths in a plane substantially parallel to said incident one of said first and second planes, and for permitting light polarized at a polarization of said first and second polarizations other than said one polarization to propagate therethrough undeflected.

* * * * *